May 8, 1956 G. J. MUCHER 2,744,777
CONTROL COUPLING
Filed Nov. 1, 1951
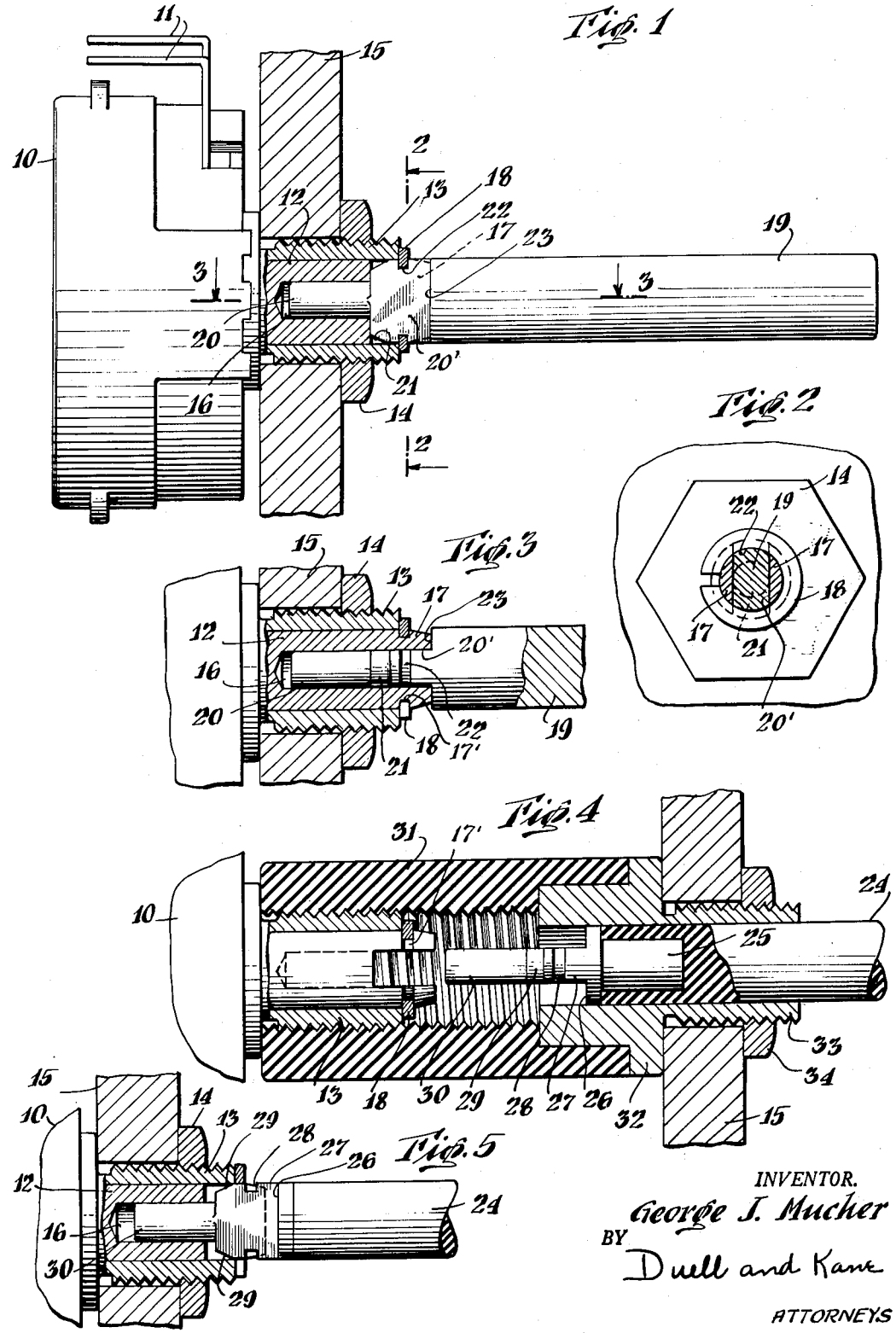
INVENTOR.
George J. Mucher
BY Duell and Kane
ATTORNEYS 2,744,777
Patented May 8, 1956

2,744,777
CONTROL COUPLING

George J. Mucher, Rochester, N. H., assignor to Clarostat Mfg. Co., Inc., Dover, N. H., a corporation of New York Application November 1, 1951, Serial No. 254,301

3 Claims. (Cl. 287—53)

This invention relates to a structurally and functionally improved coupling and especially a coupling to be used in connection with electrical controls such as potentiometers, variable resistances, switches, etc., suitable to rotary as well as push-pull operation or the combination thereof.

It is a primary object of the invention to furnish a coupling structure by means of which a workman assembling an electrical apparatus may select an operating rod or shaft of desired dimensions and properly connect that shaft to the operating member of the control with the expenditure of minimum effort and time without the necessity of employing tools or locking accessories, or employing an involved technique.

Another object is that of furnishing a coupling structure which lends itself to ready application in installations where high voltage potentials are involved or where spacing the control unit in relation to the mounting is desired for any other reason; the teachings of the present invention permitting of the support and operation of the unit to be controlled with the elimination of substantially all current leakage.

An additional object is that of providing structures of this nature which will include simple designs involving parts capable of quantity production at minimum costs and in which, moreover, these parts may be coupled by relatively unskilled labor.

With these and other objects in mind reference is had to the attached sheet of drawings illustrating practical embodiments of the invention and in which:

Fig. 1 is a partly sectional side view of one form of control coupling;

Fig. 2 is a transverse sectional view taken along the line 2—2 and in the direction of the arrows as indicated in Fig. 1;

Fig. 3 is a fragmentary sectional plan view taken along the line 3—3 and in the direction of the arrows as also indicated in Fig. 1;

Fig. 4 is a view similar to Fig. 3 but showing an alternative form of structure; and Fig. 5 is a view similar to Fig. 1 but showing a still further arrangement of the parts.

In these views the reference numeral 10 indicates the casing or housing of the control to be operated and from which terminals 11 conveniently extend. This control may comprise a rheostat, a potentiometer, a switch, etc. In any event it will usually include a rotor assembly (not shown) connected to an operating member 12 rotatable within a threaded bushing 13. When the member 12 is turned the control will be operated. A nut 14 is mounted upon the threads formed on the outer face of bushing 13 and engages against the face of a panel 15 and provided with an opening of a diameter such that the bushing 13 may extend through the same so that the control is properly mounted.

The member 12 is formed with a recess 16 which adjacent its inner end may be circular in section. Portions of the member 12 extend outwardly as indicated at 17 to a point beyond the end of bushing 13. These portions are formed with an annular groove 17' which is interrupted by the slot defined by portions 17 and disposed immediately adjacent the outer edge of the bushing 13. This groove receives a locking element preferably in the form of a ring or washer 18 of resilient material having a C-shape. With this washer in position it is apparent that axial inward movement of member 12 with respect to bushing 13 is prevented although the parts may be freely rotated with respect to each other. The space between the forward end portions 17 of member 12 should be non-circular in outline so as to cooperate with the similarly formed faces of an operating shaft. As shown, the space between the extended portions is preferably in the form of a transverse slot communicating with the recess 16. Also as shown the outer edges of the extended portion 17 are preferably bevelled so that an operator may readily force the washer 18 in an axial direction and towards unit 10 in order to position the washer within the groove formed in member 12. So positioned it will remain until it is forcibly dislodged by employing a suitable instrument to effect this result.

It is desirable in connection with controls to produce them with the rotary member 12 terminating adjacent the outer end of bushing 13. Thereupon these controls are fitted with an operating shaft embodying length and other characteristics corresponding to those desirable or necessary for the apparatus to which the control is applied. Heretofore this result has been achieved by providing the assembly of parts and connecting the rotary member of the control with the operating shaft. The connection has involved one of a number of different expedients. All of these have necessitated a painstaking association and connection of the parts requiring the use of tools. Such connection has also provided a coupling which might accidentally loosen or completely disconnect in the subsequent use of the apparatus. All of these difficulties are overcome by the present teachings.

Thus, as in Figs. 1, 2 and 3, an opening shaft 19 is provided which has at its connecting end an extended portion 20 of a diameter such that it may move in guiding relationship with the walls of the recess 16 and freely enter the latter. Intervening the main body 19 of the shaft and the extended portion 20 is a flattened part 20' having a width substantially equal to the spacing of the extended portions 17. Therefore, positioned between these portions it will completely fill the intervening transverse slot at the outer end of member 12. The outer edges of this flattened portion are defined by angularly extending surfaces 21 which provide in aggregate a wedge or cam. Intervening these edges and the main body 19 of the shaft is a groove 22 which has a width such that it may receive the ring 18. The point of juncture of the reduced inner portion of the shaft and its main body is conveniently defined by transversely extending shoulder portions 23. It is, of course, apparent that shaft 19 may be provided in various lengths and diameters or cross-sectional configurations and of any desired materials. Preferably, however, it will in the embodiment shown in Figs. 1 to 3 be of metal.

Before or after the control unit 10 has been mounted upon a panel or support 15 an operator may select a shaft having the desired characteristics and simply introduce the inner end 20 of the same into the space between the extended portions 17. With the flattened surfaces or portions of the shaft aligned with the slot between the extended parts 17 continued inward thrust may be exerted upon the shaft. This will result in the inclined edge portions 21 bearing against the inner edges of the ring or retaining member 18 and expanding the latter. This action will continue until groove 22 is aligned with that retaining member. At that instant and due to the natural resiliency of the washer or its equivalent it will snap into the groove 22. So positioned it is apparent that it will function as a latch or lock to retain shaft 19 against withdrawal and with the side faces of its flattened portions in intimate contact with the adjacent surfaces of the operating member 12 and its shoulders 23 in engagement with the outer end of that member. During the expanding operation of washer 18 the latter will not be displaced with respect to the groove of member 13 in that it will in effect be enlarged only in line with the transverse slot in that member. The end edge of flattened part 20' will bear firmly against the base of the slot in member 12 when the shaft is mounted. Also, under these circumstances, the edges defining shoulder portions 23 will simultaneously bear against the end surfaces of member 12. With the side edges of the flattened part 20' rotatably engaging the bore of bushing 13, shaft 19 is properly supported. That support is even further assured with the extended portion 20 bearing against the surface of recess 16.

With the parts operated in this manner and shifted to the positions as shown in the figures under consideration it is apparent that the operating shaft is retained against rotary or axial movements with respect to the rotary member 12. Therefore, when shaft 19 is rotated through a pre-determined arc, member 12 will be similarly oscillated. The operating shaft 19 will also be supported in axial alignment with shaft 12 and will therefore extend in a desired manner from the support 15. With the parts so positioned an operating knob (not shown) may conveniently be attached to shaft 19 and the coupling and operative association of the parts of the assembly will now be completed. As afore brought out, the control will normally be of the rotary type. However, it is apparent that the foregoing teachings might be applied to a control involving a push-pull operation or a unit involving such an operation plus a rotation of its parts.

Controls such as those herein contemplated are frequently employed in circuits involving high voltage. Under these circumstances it is not desirable to have the operating shaft formed of metal. Rather it should be provided of insulating material which will prevent leakages as well as the danger of injury to the operator. Thus, as in Figs. 4 and 5, a shaft 24 may be provided of suitable di-electric material and involving any desired length, diameter and cross-sectional configuration although as shown it will ordinarily be round. This shaft is conveniently provided at its inner end with a non-circular recess into which the extended part 25 of an operating element projects. That operating element is conveniently formed of metal and its inner end is anchored within the recess in any desired manner.

The element includes a base portion 26 which is preferably circular and from which an extended portion 27 projects. The latter is flattened and in accordance with the previously described structure has a width such that it may be received within the transverse slot defined between the extended portions 17 of member 12. A groove 28 is formed in the edges of this flattened portion and has a width such that it may receive the washer 18. Inclined edge portions 29 are provided forwardly of the groove 28. These edge portions furnish in aggregate a wedge or cam structure and the element is continued beyond them in the form of a circular guiding portion 30 to be received within recess 16.

It is frequently desirable to space the control 10 from the mounting panel 15 or its equivalent, either due to the design of an assembly of apparatus, or because of high voltages which are involved. Where the latter problem exists, a tube 31 of suitable insulating material has its bore threaded so that it may be mounted upon the bushing 13. This tube supports adjacent its outer end a sleeve 32 preferably of metal and which is extended as at 33 to project through an opening in the mounting panel 15. A nut 34 is mounted upon the threads of the extended portion 33. With this nut tightened the entire assembly is, of course, supported by the panel or member 15. Supplemental supporting structure may also be used. Employing a shaft formed of di-electric material as just described it thus becomes feasible to space the control from the mounting panel a distance such that it will be properly disposed in isolated electrical relation not alone with respect to that panel but also with respect to other units which may be mounted by that panel.

The operating shaft 24 will in that instance have a length sufficient to provide for the additional distance required incident to the use of the insulating tube 31. The association of the operating shaft with the assembly of the control will be precisely as heretofore described. The only exception will, of course, be that it will be introduced through the bore of the sleeve extension 33. Thereupon by continued axial movement and with the flattened portion 27 aligned with respect to the slot between the extended portions 17, it will be thrust into position to a point where its inclined edges 29 wedged against ring 18 to expand the latter so that groove 28 receives the ring and the outer faces of its base 26 bear against the outer end edges of bushing 13. Of course the insulating shaft 24 need not necessarily be used with a spacing tube 31; this having been shown in Fig. 5.

Thus, among others, the several objects of the invention as specifically aforenoted are achieved. Obviously numerous changes in construction and rearrangement of the parts might be resorted to without departing from the spirit of the invention as defined by the claims.

I claim:

1. In an electrical control in combination a bushing, an operating member rotatable within and having an outer end extending beyond such bushing, said member being formed with a transverse slot extending in line with the axis thereof from a point within the bushing through to the outer end of said member to provide substantially semicircular outer end surfaces for said member—one to each side of said slot—an operating shaft, a solid flattened portion therefor extending in line with its axis and terminating in an outer edge, shoulders extending perpendicular to said outer edge and each constituting substantially one-third of the shaft area at the inner end of said flattened portion, the latter being disposed within the slot of said member with its outer edge bearing in firm contact with the base of such slot, its shoulders extending at right angles to said outer shaft edge in contact with the end surfaces of said member and its side edges in sliding engagement with the bore surface of the bushing and means for retaining said shaft against axial separation with respect to said member.

2. In an electrical control as specified in claim 1, said operating member being formed with a recess extending inwardly of the base of its slot and a portion of said shaft extending beyond the flattened end portion and received in said recess with the parts disposed as specified.

3. In an electrical control as specified in claim 1, said shaft retaining means comprising a retaining ring, the member being formed with a groove extending around its slotted end, the flattened portion of said shaft being formed with grooves alignably with said first-named groove and said ring being common to said grooves, and extending into the same.

References Cited in the file of this patent

UNITED STATES PATENTS

| | | |
|---|---|---|
| 1,053,219 | Rhodus | Feb. 18, 1913 |
| 2,143,401 | Arvin | Jan. 10, 1939 |
| 2,183,824 | Smith | Dec. 19, 1939 |
| 2,280,929 | Rah et al. | Apr. 28, 1942 |
| 2,437,785 | Mucher | Mar. 16, 1948 |
| 2,455,765 | Harvey | Dec. 7, 1948 |
| 2,511,586 | Hubbard | June 13, 1950 |